(12) United States Patent
Mitchell

(10) Patent No.: US 7,204,169 B2
(45) Date of Patent: Apr. 17, 2007

(54) GEAR SHIFTING MECHANISM

(76) Inventor: Ross Mitchell, 14626 - 87th Avenue, Surrey, British Columbia (CA) V3S 6R2

( * ) Notice: Subject to any disclaimer, the term of this patent is extended or adjusted under 35 U.S.C. 154(b) by 214 days.

(21) Appl. No.: 10/410,291

(22) Filed: Apr. 10, 2003

(65) Prior Publication Data

US 2004/0200307 A1    Oct. 14, 2004

(51) Int. Cl.
F16C 1/10 (2006.01)
F16H 53/00 (2006.01)
F16H 53/06 (2006.01)

(52) U.S. Cl. .................. 74/489; 74/502.2; 74/567; 74/569

(58) Field of Classification Search .................. 74/489, 74/502.2, 567, 569
See application file for complete search history.

(56) References Cited

U.S. PATENT DOCUMENTS

| | | | |
|---|---|---|---|
| 1,114,440 A | | 10/1914 | Brix |
| 1,281,043 A | * | 10/1918 | Magner ........................ 74/489 |
| 1,511,261 A | * | 10/1924 | Brown ......................... 74/489 |
| 1,556,411 A | * | 10/1925 | Brown ......................... 74/489 |
| 1,834,724 A | * | 12/1931 | Alexander ..................... 74/489 |
| 2,788,676 A | * | 4/1957 | Spexarth ....................... 74/489 |
| 4,201,095 A | | 5/1980 | Cirami |
| 4,241,687 A | | 12/1980 | DuBois et al. |
| 4,279,174 A | | 7/1981 | Ross |
| 4,900,291 A | | 2/1990 | Patterson |
| 4,938,733 A | | 7/1990 | Patterson |
| 5,102,372 A | | 4/1992 | Patterson et al. |
| 5,370,017 A | | 12/1994 | Krauer |
| 5,572,907 A | * | 11/1996 | Kaakinen ...................... 74/489 |
| 5,577,969 A | | 11/1996 | Watarai |
| 5,588,331 A | * | 12/1996 | Huang et al. .................. 74/489 |
| 5,666,858 A | * | 9/1997 | Von Der Osten-Sacken et al. ........................... 74/489 |
| 5,674,142 A | | 10/1997 | Jordan |
| 5,685,198 A | | 11/1997 | Hawkins |
| 5,921,138 A | | 7/1999 | Kojima et al. |

(Continued)

FOREIGN PATENT DOCUMENTS

DE    195 06 219    8/1996

(Continued)

OTHER PUBLICATIONS

EGS for Synchro Shift™, advertisement.

(Continued)

*Primary Examiner*—Vinh T. Luong
(74) *Attorney, Agent, or Firm*—Oyen Wiggs Green & Mutala LLP

(57) ABSTRACT

An apparatus and accompanying method are disclosed for a handgrip based gear-shifting mechanism used to manipulate the front and rear derailleur cables on a vehicle having a multi-sprocket gear system. The gear-shifter comprises a substantially hollow handgrip member that has first and second cam guide paths in the bore of its substantially cylindrical surface. First and second cam followers, preferably located inside the bore of the handgrip member, engage the first and second cam guide paths respectively. The first and second cam followers are coupled to the front and rear derailleur cables, such that a single rotation of the handgrip simultaneously adjusts the positions of the first and second cam followers and the front and rear derailleur cables.

27 Claims, 14 Drawing Sheets

U.S. PATENT DOCUMENTS 5,970,816 A * 10/1999 Savard .................. 74/489
6,978,694 B2 * 12/2005 Peppard ................ 74/489

FOREIGN PATENT DOCUMENTS

| DE | 296 14 088 | 10/1996 |
| GB | 688 897 | 3/1953 |
| GB | 764037 | 12/1956 |
| JP | 09 150791 | 7/2002 |
| WO | WO 96/32316 | 10/1996 |
| WO | WO 97/18986 | 5/1997 |
| WO | WO 01/58747 | 8/2001 |

OTHER PUBLICATIONS

Printouts from EGS's website—http://www.e-g-s.com/concept/choix1.html—re: Synchro Shift™, (Aug. 17, 2004).
-International Search Report for PCT/CA2004/000538 dated Aug. 31, 2004.

* cited by examiner

GEAR SHIFTING MECHANISM

TECHNICAL FIELD

The invention relates to apparatus for actuating shifting mechanisms in devices having multi-sprocket variable-ratio power transmissions. The invention may be embodied in a bicycle gear changing mechanism.

BACKGROUND OF THE INVENTION

A typical multi-speed bicycle has a chain drive, which connects a pedal-driven crank to a driven wheel. The chain drive may have several front sprockets (chain rings) of different pitch diameters and several rear sprockets of different pitch diameters. The front sprockets are connected to the crank and rotate with the pedals. The rear sprockets are coupled to the driven wheel of the bicycle. A chain couples one of the front sprockets to one of the rear sprockets. Different gear ratios can be selected by moving the chain so that it couples a selected front sprocket to a selected rear sprocket.

Such bicycles typically have cable-actuated front and rear derailleurs. A cyclist can operate the front derailleur to move the chain to a selected one of the front sprockets. The cyclist can operate the rear derailleur to move the chain to a selected one of the rear sprockets.

There are various handlebar mounted mechanisms, which a cyclist can use to operate the front and rear derailleurs to achieve a desired gear ratio. For example, some bicycles have a pivotable lever mounted on each side of the handle bar. One lever is connected to a cable that operates the front derailleur and the other is connected to a cable that operates the rear derailleur. A cyclist can select a desired gear ratio by pivoting the levers.

The GRIP SHIFT™ shifting mechanism provides a pair of handle-bar mounted collars. One collar is mounted to a bicycle's right handlebar and the other to the bicycle's left handlebar. One of the collars is connected to a cable that operates the front derailleur. The other collar is connected to a cable that operates the rear derailleur. A cyclist can rotate the collars relative to the bicycle handlebar to select a desired gear ratio.

Cirami, U.S. Pat. No. 4,201,095, describes a bicycle gear-shifter having a single lever that operates both front and rear derailleurs to yield a progressive and programmed series of gear ratios. The Cirami mechanism has two flat plane cams. Intermediate drive ratios are obtained in consecutive increments ordered from the lowest to the highest drive ratio positions of the lever. Cirami proposes a shift pattern that avoids gear ratios that result in cross chaining.

Ross, U.S. Pat. No. 4,279,174, discloses another bicycle gear shifter which permits a cyclist to operate front and rear derailleurs by manipulating a single control. The Ross shifter requires two types of derailleurs: a spring-biased front derailleur and a "push-pull" rear derailleur. The Ross shifter is constructed to provide a progressive shift pattern. Ross describes a shift pattern in which four changes involve shifting or changing the position of both derailleurs simultaneously to provide a progressive series of gear ratios.

Watarai, U.S. Pat. No. 5,577,969, discloses an electronic apparatus for controlling both the front and rear derailleurs of a bicycle. A cyclist can cause the apparatus to shift between gears by operating a lever.

Brix, U.S. Pat. No. 1,114,400, describes a mechanism for adjusting the positions of rods, which control the spark control, throttle, muffler control and engine clutch of a motorcycle. Each control rod is independently adjusted. The Brix mechanism employs two cylindrical sleeves, which are coupled to, and located within, the motorcycle handgrip. Each sleeve is associated with one of the control rods and features a helical groove in its cylindrical surface. When the rider rotates the handgrip, one sleeve is rotated, while the other is prevented from rotating. A cam follower travels in the helical groove of the rotating sleeve, causing longitudinal movement of the associated control rod.

Savard, U.S. Pat. No. 5,970,816, describes a bicycle gear shifter, which provides a mechanism for controlling both front and rear derailleurs. The mechanism is operated by rotating one handgrip. A cylindrical barrel is attached to the inner end of the handgrip. The barrel has a track on each of its inner and outer faces. Cables from the front and rear derailleurs are each connected to a corresponding one of a pair of cam followers. The cam followers each slide in one of the tracks. When the barrel is rotated, the members move the derailleur cables to select different gear ratios. The cam followers and follower guides are located close to each other on the outside of the handlebar. This results in a large bulbous assembly on the inboard side of the separate rotatable handgrip. A separate detent mechanism holds the collar in a position corresponding to the selected gear ratio. Like Cirami, Ross, and others, the Savard mechanism may be constructed to provide an optimal shift pattern in which undesirable or redundant gear combinations are avoided. A mechanism like the Savard mechanism is marketed by EGS of France under the trademark SYNCHRO SHIFT™. The SYNCHRO SHIFT™ mechanism is undesirably bulky. Its size makes it incompatible with standard bicycle brake levers.

Socard, U.S. Pat. No. 5,447,475 discloses two separate and quite different bicycle gear shifting mechanisms. The mechanisms provide an optimal shift pattern that avoids cross chaining. The mechanisms are actuated via a cable that links to a handle bar mounted shift mechanism which provides two levers; one for shifting up and the other for shifting down. The mechanisms include a cam which rotates 90 degrees for each shift.

Wechsler, U.S. Pat. No. 4,530,678, discloses a bicycle gear shifting mechanism that uses a cylindrical cam with a cam follower to control a rear derailleur. The cam is integrated into the rear derailleur mechanism and has cam grooves cut into its exterior surface. A second rotary cam is used to control a front derailleur. The second cam is integrated into the front derailleur. There is a cable that mechanically connects the front and rear derailleurs so that as one moves, the other also moves. Wechsler's front derailleur cam is shaped to cause the front derailleur to alternate between a large and small chain ring with each consecutive shift.

Patterson, U.S. Pat. No. 4,900,291 discloses a bicycle gear shifting mechanism which has a rotatable handgrip actuator cam that is coupled via a cable to a derailleur mechanism. Separate independent cams are provided for controlling front and rear derailleurs. A cam surface on an edge of each cam abuts against a fixed post. The cam surface has peaks and valleys and uses cable tension to index the shifter. As a cam is rotated the cam slides longitudinally. An end of the cable is attached to the cam.

Ethington, U.S. Pat. No. 5,681,234, discloses an "Automatic Transmission Shifter For Velocipedes" that employs speed and force sensors as well as a programmable logic controller and two servo motors to automatically shift a bicycle transmission according to operating conditions. Ethington discloses a shift pattern that uses all gears in an ascending sequence. Many of the speed changes involve shifting both front and rear derailleurs simultaneously.

Nier, U.S. Pat. No. 5,803,848, discloses a shifter system that employs a shift pattern that is identical to the one used by Socard and others. This system uses flat radial cams that are linked and rotatably mounted on a handle bar. Nier's system combines a cam which operates the front derailleur by way of a mechanical linkage and two other cams with nodes that actuate electric motors to either pull or release the rear derailleur by predetermined amounts. The use of these three cams in combination results in an optimal shift pattern.

Lahat, U.S. Pat. No. 5,865,062, discloses several mechanisms that control both front and rear derailleurs to achieve an optimal shift pattern. These mechanisms show both single cylinders with two cam surfaces and several arrangements of dual cylinders with single cam surfaces. In all cases the cams and followers are located on the exterior of the handlebar. In some cases, the cam and follower assembly are mounted in a separate casing and are not rotatably mounted on the handlebar. In all cases, the mechanisms are "aimed at synchronously controlling both front and rear derailleurs to achieve a predetermined sequential combinations of front and rear gears.

Despite the long history of bicycle development and the large variety of shifting mechanisms that have been proposed for bicycles, there remains a need for practical gear shifting mechanisms suitable for use in bicycles and other pedal-powered vehicles. There is a particular need for such mechanisms, which permit a user to select a desired gear ratio without needing to separately control two shifting mechanisms.

SUMMARY OF THE INVENTION

This invention provides ratio selecting mechanisms and related methods. The ratio selecting mechanisms may be used in bicycles, and other pedal powered mechanisms. The ratio selecting mechanisms may also be used in other applications, wherein a gear ratio is selected by controlling two mechanisms.

One aspect of the invention provides a gearshift mechanism. The mechanism comprises a rotatable handgrip member with first and second guide paths on an inner surface within its bore. First and second followers are configured to engage the first and second guide paths respectively and first and second cable anchors are coupled respectively to the first and second followers. Rotation of the handgrip member simultaneously adjusts the positions of the first and second cable anchors.

The first and second followers may be on opposing sides of the bore.

The first and second guide paths may comprise grooves on the surface of the handgrip member. One or more of the grooves may comprise a plurality of indentations on one of its sides and the indentations may be located at detent positions. The indentations may be conveniently provided in the groove that controls the operation of a front derailleur. In the alternative, the indentations may be provided in the groove that controls the operation of the rear derailleur or distributed between grooves which control the operations of front and rear derailleurs. In the further alternative, a separate detent mechanism may be provided to hold the handgrip member in positions corresponding to selected gear ratios.

The handgrip member may be rotatably mounted on a hollow handlebar. The first and second followers may be coupled respectively to the first and second cable anchors by members that extend through a bore of the handlebar. With such an embodiment, the first and second followers may extend through longitudinally disposed slots in the handlebar. Each follower may comprise a head portion, which is wider than a corresponding one of the slots and a neck portion, which passes through the corresponding slot. The neck portions of the followers may be elongated relative to the head portions of the followers. Each of the slots may have an enlarged portion, through which the head portion of the corresponding follower can pass. The enlarged portion(s) are located outside of the normal range of motion of the followers.

The handgrip member may also comprise one or more substantially cylindrical cam members. The inside walls of the cam members may bear the first and second guide paths. The cam members may be affixed within a bore of a substantially tubular outer handgrip member. The first and second guide paths may comprise grooves on the surfaces of the one or more cam members. The grooves may penetrate the walls of the one or more cam members.

The cable anchors may project from the members through additional longitudinally disposed slots in the handlebar. The gearshift mechanism may comprise a bracket on each of the cable anchors, the bracket having a width greater than that of the corresponding additional slot.

The gearshift mechanism may be used in combination with a transmission comprising: a plurality of front sprockets, a chain, a plurality of rear sprockets, a cable-actuated front derailleur capable of engaging the chain with a selected one of the front sprockets, a cable-actuated rear derailleur capable of engaging the chain with one of the plurality of rear sprockets, a first cable connecting the first cable anchor to the front derailleur, and a second cable connecting the second cable anchor to the rear derailleur.

The handgrip member may be rotatably mounted on a handlebar and the first and second followers may be coupled respectively to the first and second cable anchors by members, which slide in longitudinally extending recesses in the handlebar.

Another aspect of the present invention provides a gearshift mechanism comprising: a hollow handlebar, a member mounted for longitudinal movement within the handlebar, a cable anchor projecting from the member through a slot in a wall of the handlebar, and an actuating mechanism coupled to move the member longitudinally between a plurality of selected positions.

Another aspect of the invention provides a bicycle, which comprises: a frame, a handlebar, a plurality of front sprockets mounted to the frame, a chain, a plurality of rear sprockets, a cable-actuated front derailleur capable of engaging the chain with a selected one of the front sprockets, a cable-actuated rear derailleur capable of engaging the chain with one of the plurality of rear sprockets, a first cable connected at its first end to the front derailleur, a second cable connected at its first end to the rear derailleur, and a gearshift mechanism. The gearshift mechanism comprises a handgrip member rotatably mounted on the handlebar. The handgrip member has first and second guide paths on a substantially cylindrical inner surface of its bore. A first follower engages the first guide path and is coupled to the first cable at its second end and a second follower engages the second guide path and is coupled to the second cable at its second end. Rotation of the handgrip member relative to the handlebar simultaneously adjusts the front and rear derailleurs.

Another aspect of the invention provides for a method of controlling the positions of a first member and a second member along a longitudinal axis. The method involves locating the first and second members within a bore of a handgrip at first and second angular positions respectively about the longitudinal axis. The first and second members are made to respectively engage first and second guide paths on an inner surface of the handgrip. The method also involves rotating the handgrip about the longitudinal axis, while maintaining the first and second angular positions substantially fixed. In this manner, the positions of the first and second members along the longitudinal axis are independently determined by the shapes of the first and second guide paths.

The method may also comprise adjusting positions of first and second cables, which may be coupled respectively to the first and second members.

Other aspects and features of the invention and descriptions of specific embodiments of the invention are described below.

BRIEF DESCRIPTION OF THE DRAWINGS

In drawings, which depict non-limiting embodiments of the invention,

FIGS. 8A and 8B are respectively enlarged views of the portions of FIG. 8 within areas 8A and 8B;

FIGS. 9A and 9B are respectively enlarged views of the portions of FIG. 9 within areas 9A and 9B;

FIG. 13 is an elevational view of a shifter according to an alternative embodiment of the invention and FIGS. 13A–13D are cross sections through the gear shifting mechanism of FIG. 13; and, FIG. 14 is an elevational view of a shifter according to an alternative embodiment of the invention

DETAILED DESCRIPTION

The following description describes embodiments of the invention which are useful for selecting gear ratios in a pedal-powered apparatus. In particular, the following description describes a bicycle having a cable-actuated front derailleur, capable of placing a drive chain onto a selected one of a plurality of front sprockets and a cable-actuated rear derailleur, capable of placing the drive chain onto a selected one of a plurality of rear sprockets. The invention is not limited to such embodiments however.

In this description, a numeral followed by the letter "F" refers to an element that is associated with a front derailleur. The same numeral followed by the letter "R" is a reference to a corresponding element that is associated with the rear derailleur. The same numeral standing on its own refers generally to the elements associated with both the front and rear derailleurs.

Figure 1:
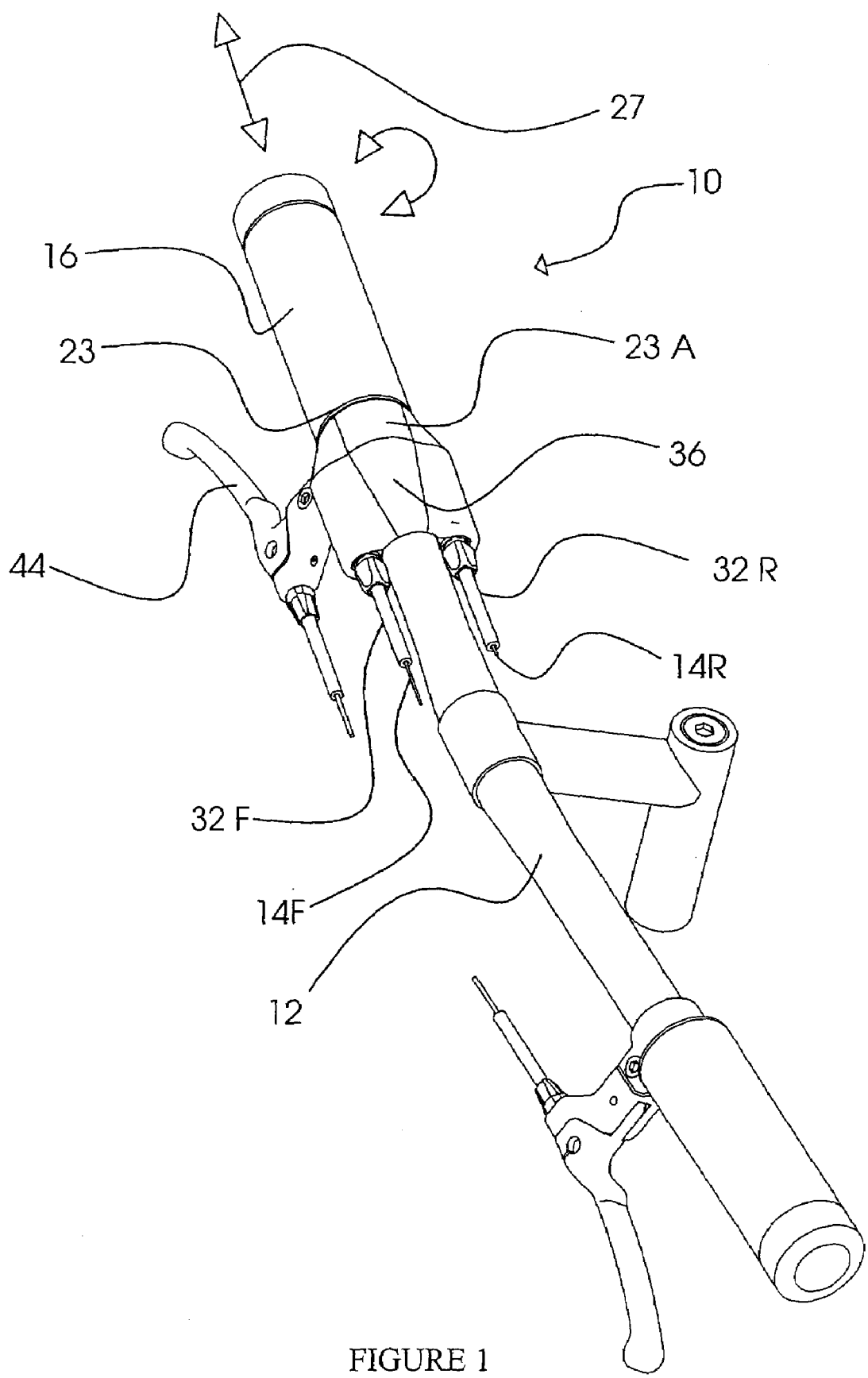
FIG. 1 is an isometric view of a gear shifting mechanism according to one embodiment of the invention, which is mounted on a bicycle handlebar.
Figure 2:
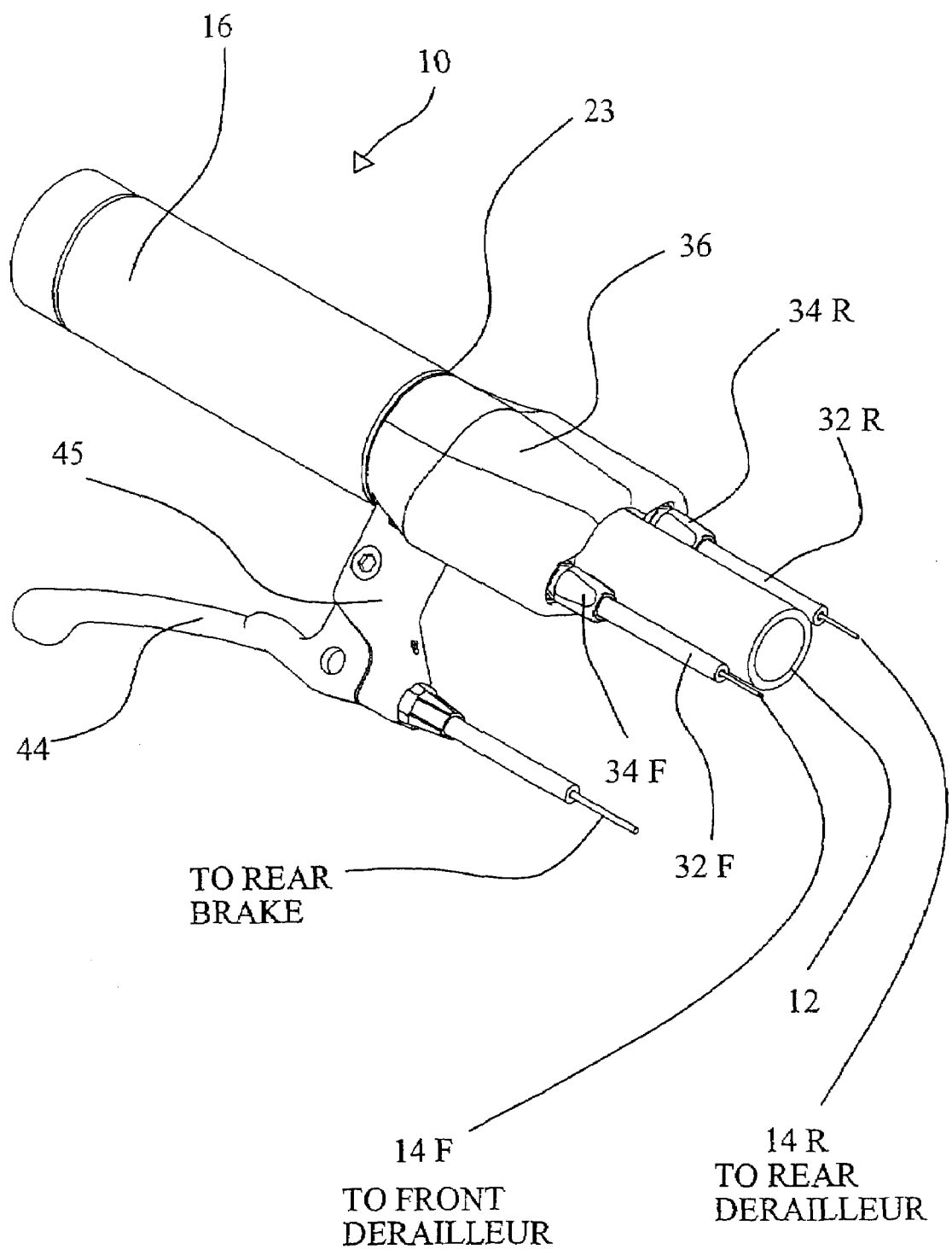
FIG. 2 is a close-up view of the gear shifting mechanism of FIG. 1.
Figure 3:
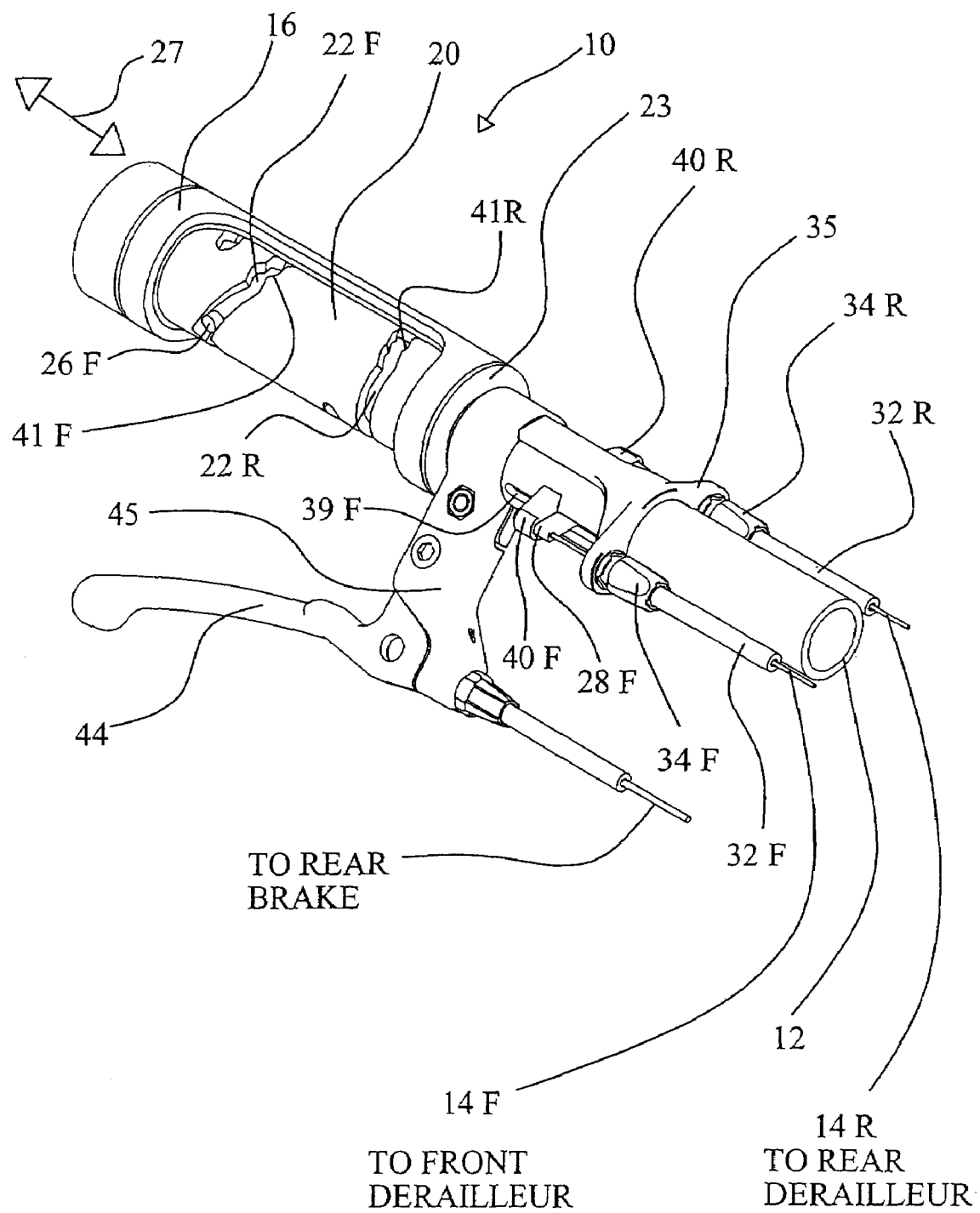
FIG. 3 is a partially cut-away view of the gear shifting mechanism of FIG. 1.
Figure 4:
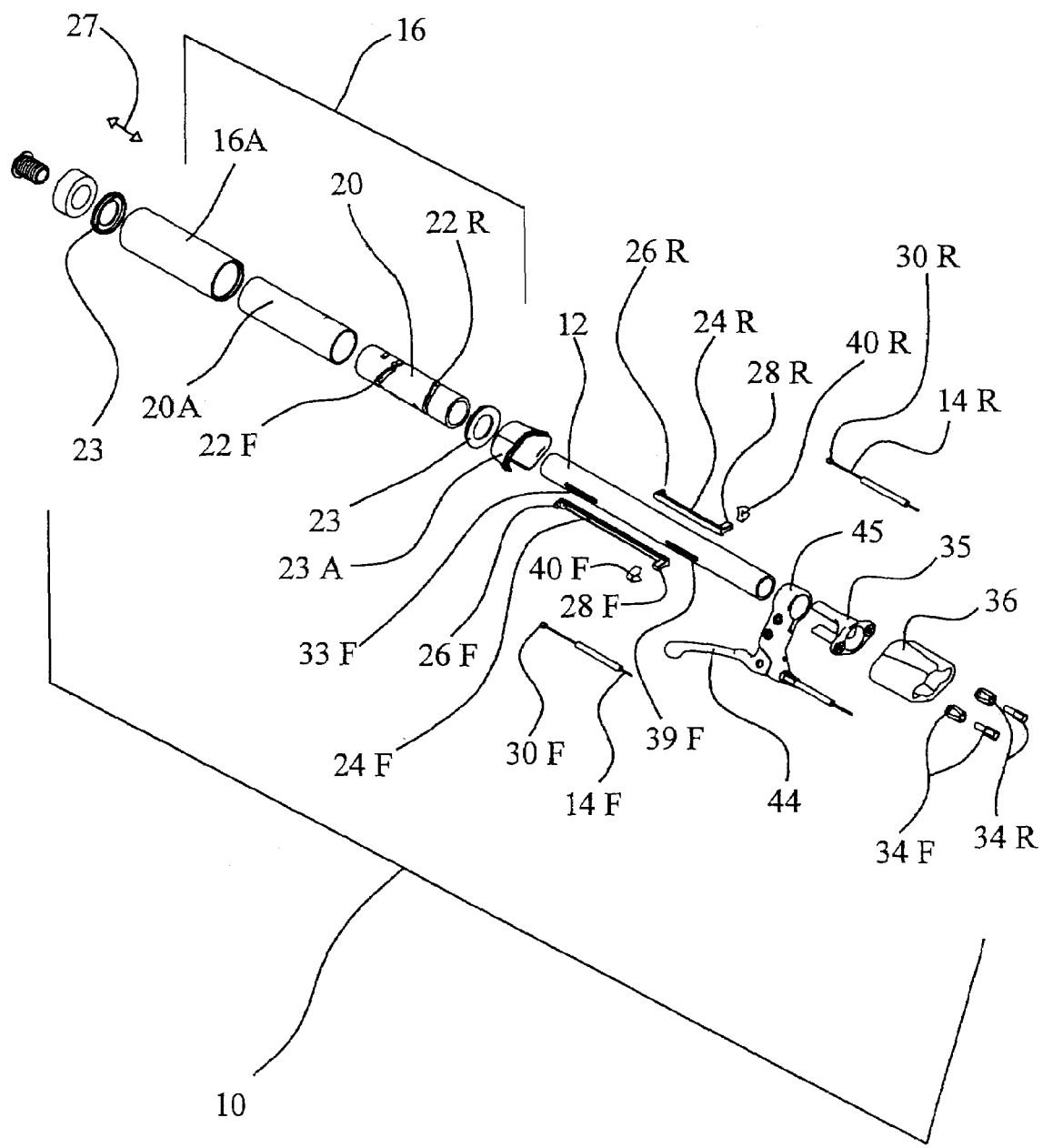
FIG. 4 is an exploded view of the gear shifting mechanism of FIG. 1.

FIGS. 1 through 3 show a gear shifting mechanism 10 mounted on a bicycle handlebar 12. FIG. 4 is an exploded view of mechanism 10. In FIG. 4 the parts of mechanism 10 have been exploded both radially and axially. As a consequence, members 24R and 24F. which are normally within handlebar 12 (as shown, for example, in FIGS. 1 to 3) are displayed outside of handlebar 12 in the exploded view of FIG. 4. Gear shifting mechanism 10 controls front and rear derailleurs (not shown) by way of cables 14F and 14R respectively. Mechanism 10 can be operated by rotating a handgrip 16. As handgrip 16 is rotated in a first angular direction, mechanism 10 moves cables 14F and 14R in a coordinated manner, so as to select progressively increasing gear ratios. As handgrip 16 is rotated in a second angular direction opposite to the first angular direction, mechanism 10 moves cables 14F and 14R in a coordinated manner, so as to select progressively decreasing gear ratios.

Handgrip 16 may be covered with a resilient material. The outside of handgrip 16 has a shape which can be comfortably gripped. For example, the outside of handgrip 16 may be cylindrical or generally cylindrical. Handgrip 16 preferably has a diameter, which does not exceed about 38 millimetres, so that it can be readily grasped by children and adult users with typical-sized hands. Handgrip 16 includes a cam cylinder 20, which is coupled to rotate with handgrip 16 relative to handlebar 12. Cam cylinder 20 may be integral with handgrip 16 or may comprise a separate part. In the illustrated embodiment, handgrip 16 comprises an outer handgrip member 16A having a bore 16B. Cam cylinder 20 is received in bore 16B of outer handgrip member 16A. Handgrip 16 has a bore 16C that extends through cam cylinder 20. Handgrip 16 can be rotated about an axis 17.

Cam cylinder 20 has a bore 21, which receives one end of handlebar 12. An inner end 20' of cam cylinder 20 bears against a surface which prevents cam cylinder 20 from sliding inwardly along handlebar 12. A pair of guide paths 22 are defined in bore 21. In the illustrated embodiment, guide paths 22F and 22R each comprise a groove. Cam cylinder 20 may comprise an outer sleeve 20A. In FIG. 4, cam cylinder 20 and outer sleeve 20A are shown as being separated axially in FIG. 4 so that guide paths 22F and 22R can be seen. Cam cylinder 20 may also have a one-piece construction as shown, for example, in some other Figures.

In the illustrated embodiment (see FIG. 4) a gasket 23 of a low friction plastic material such as Delrin™ is provided on the inboard end of cam 20. Gasket 23 rotates with cam 20 and bears against the flat surface of housing 23A which in turn bears against brake post 45 which is clamped to handlebar 12. Gasket 23 prevents cam 20 and housing 23A from wearing where they rub against one another and provides increased contact surface area with cam 20 and housing 23A.

Figures 5, 5A:
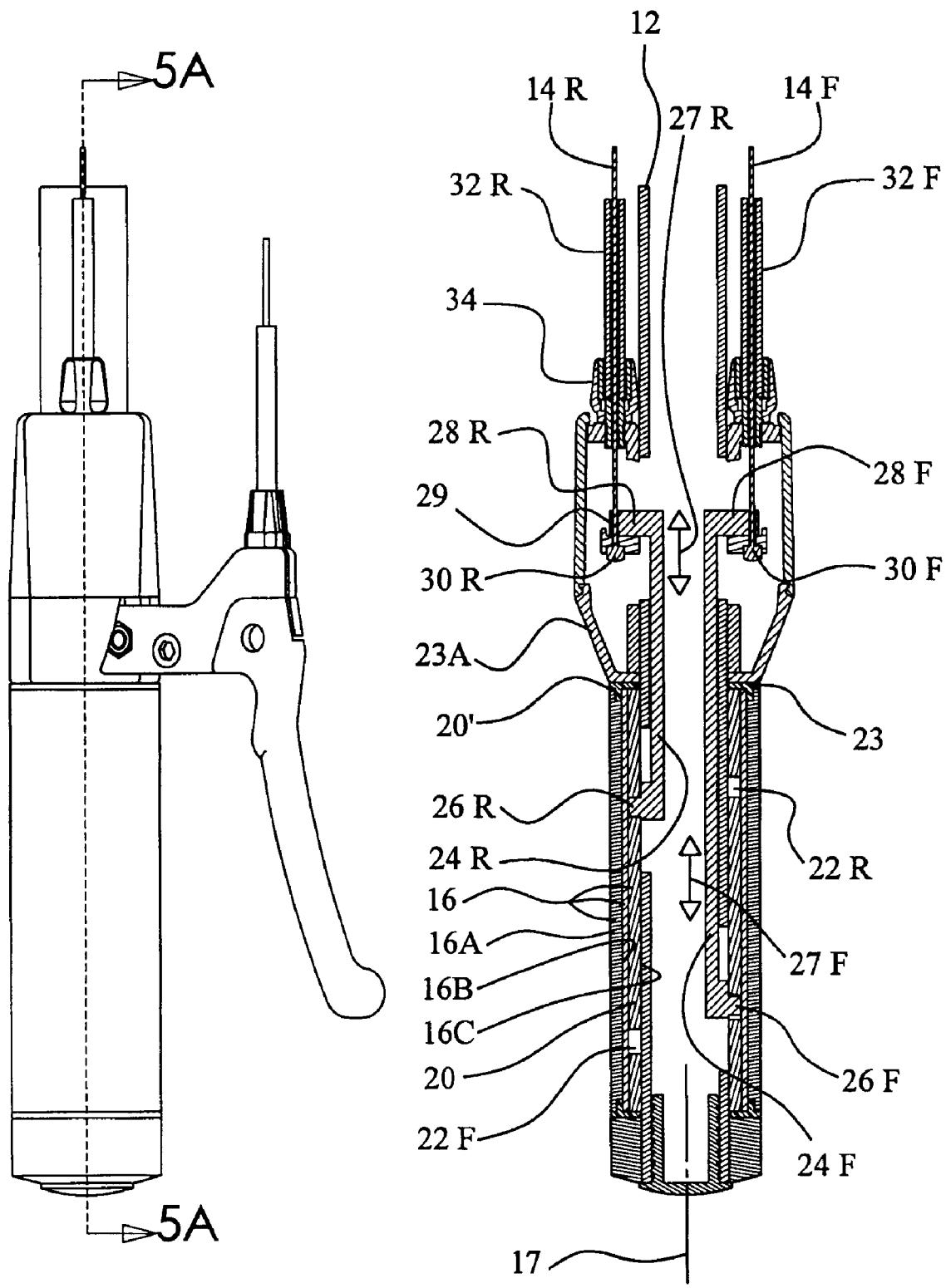
FIG. 5 is a plan view of the gear shifting mechanism of FIG. 1.
FIG. 5A is a longitudinal cross-sectional view of the gear shifting mechanism of FIG. 1 in the plane 5A—5A of FIG. 5.
Figures 6, 6A, 6B, 6C, 6D:
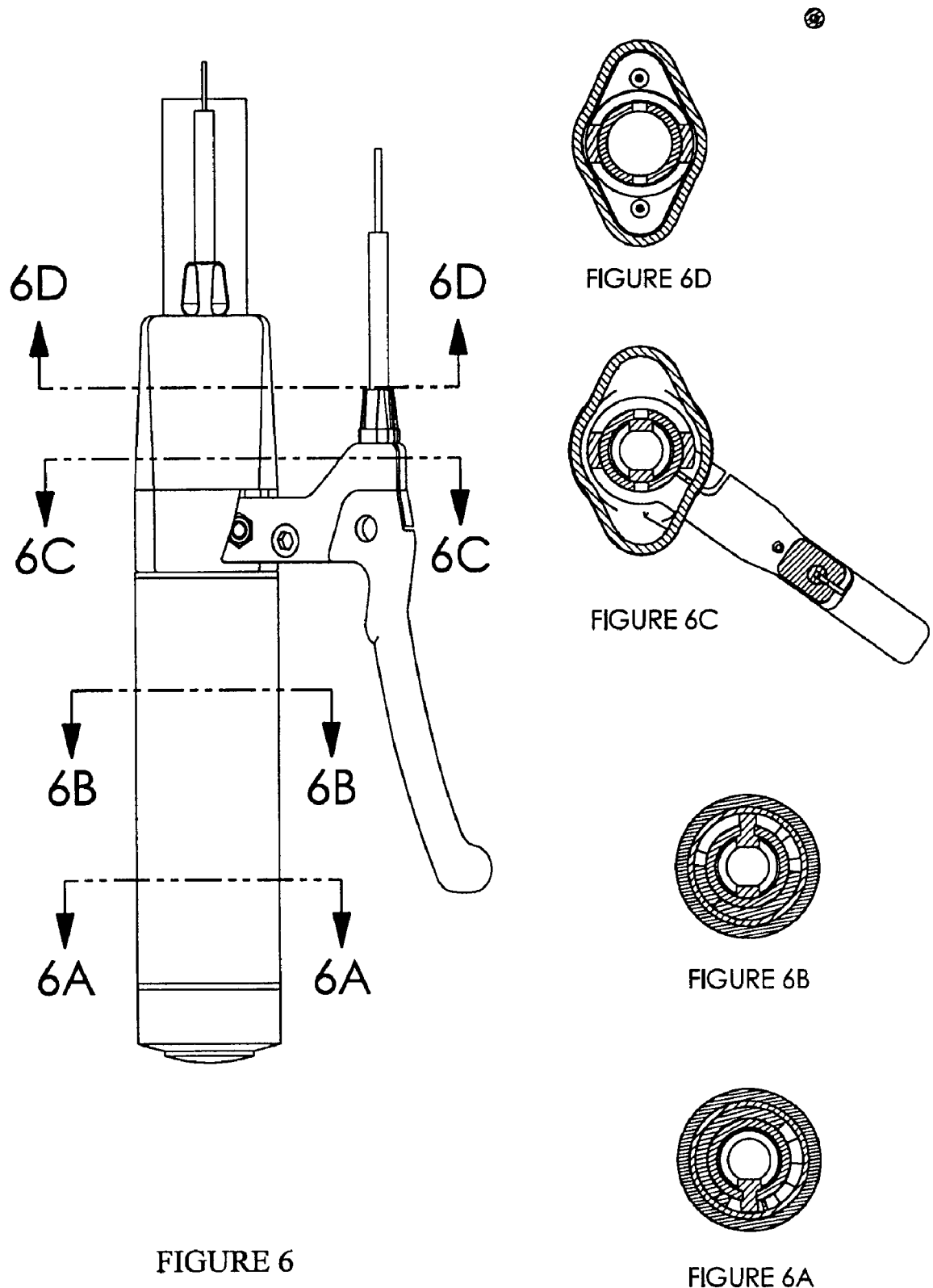
FIGS. 6A, 6B, 6C and 6D are transverse cross-sectional views of the gear shifting mechanism of FIG. 1 in the planes 6A—6A, 6B—6B and 6C—6C and 6D—6D respectively of FIG. 6.
Figure 7:
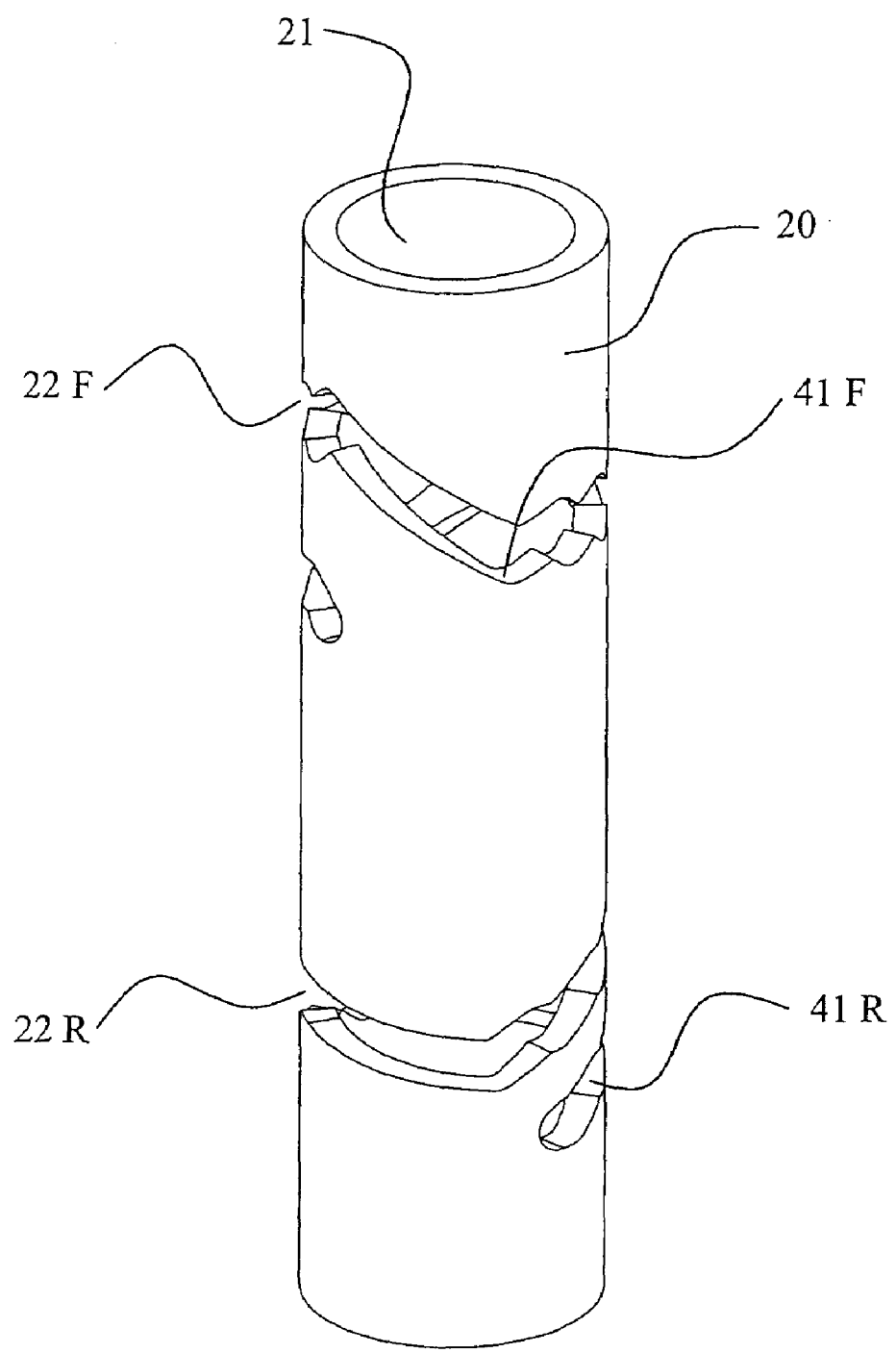
FIG. 7 is an isometric view of a cam cylinder of a gear shifting mechanism similar to the gear shifting mechanism of FIG. 1, according to another embodiment of the invention.

The position of each cable 14 is controlled by one of a pair of members 24 (see FIG. 5A), each of which includes a follower 26. Followers 26 each engage a corresponding one of guide paths 22. Members 24 are at fixed circumferential locations relative to handlebar 12, but are free to travel longitudinally. As handgrip 16 is rotated relative to handlebar 12, followers 26 move members 24 longitudinally as indicated by arrows 27F and 27R. In the illustrated embodiment, followers 26 comprise pins, which project into the groove of the corresponding guide path 22. Followers 26 are cylindrical and have diameters slightly less than the widths of the grooves into which they project. As best seen in FIG. 6C, the radially outermost ends of followers 26 may be curved to conform with the curves of the bases of guide paths 22. This permits the area of contact between followers 26 and the surfaces of guide paths 22 to be increased.

Each cable 14 is coupled to a corresponding one of members 24. In the illustrated embodiment each member 24 has a cable anchor 28, which receives one of cables 14.

Figure 8:
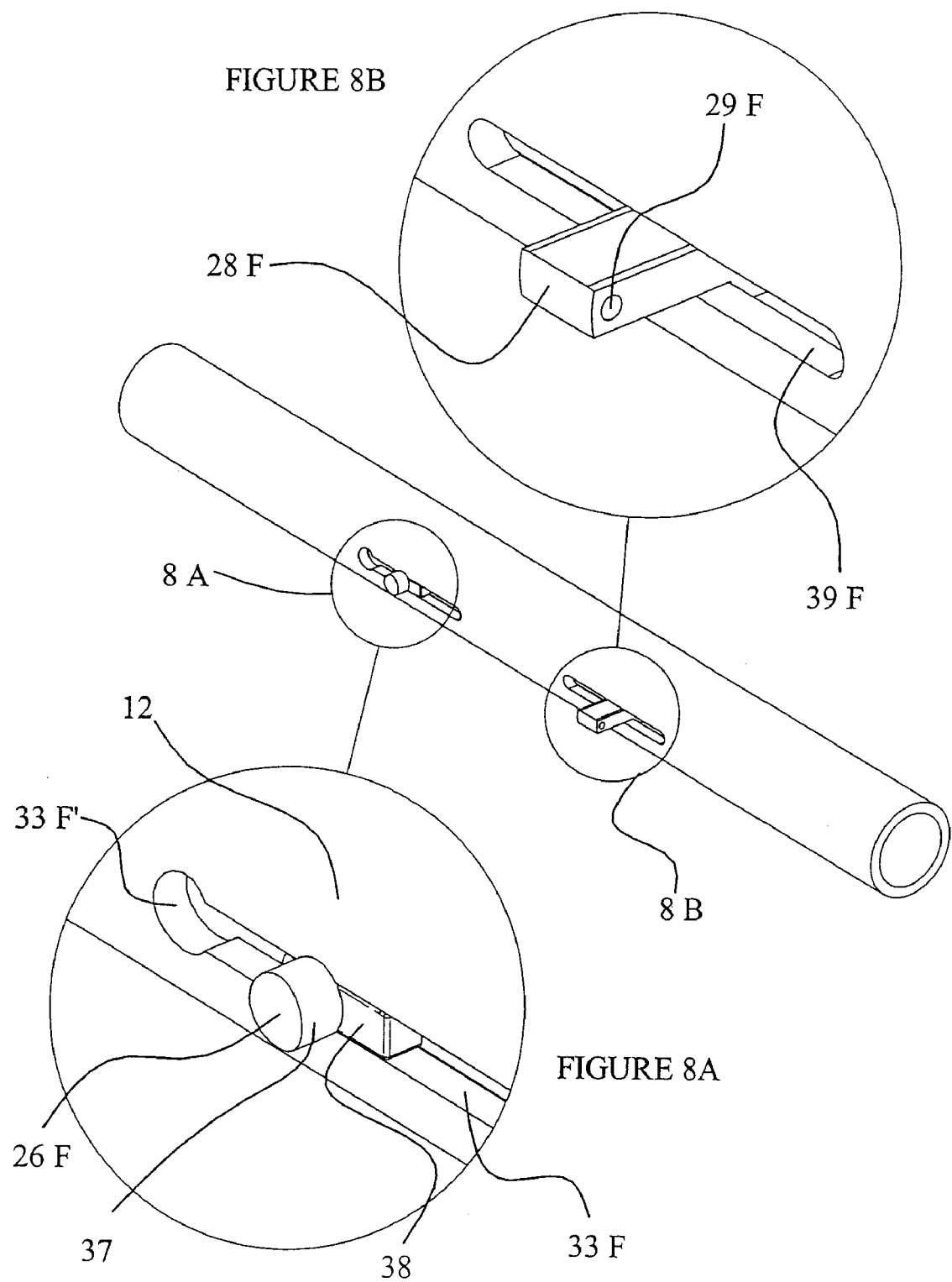
FIG. 8 is an isometric view of a portion of the handlebar of FIG. 1.
Figure 9:
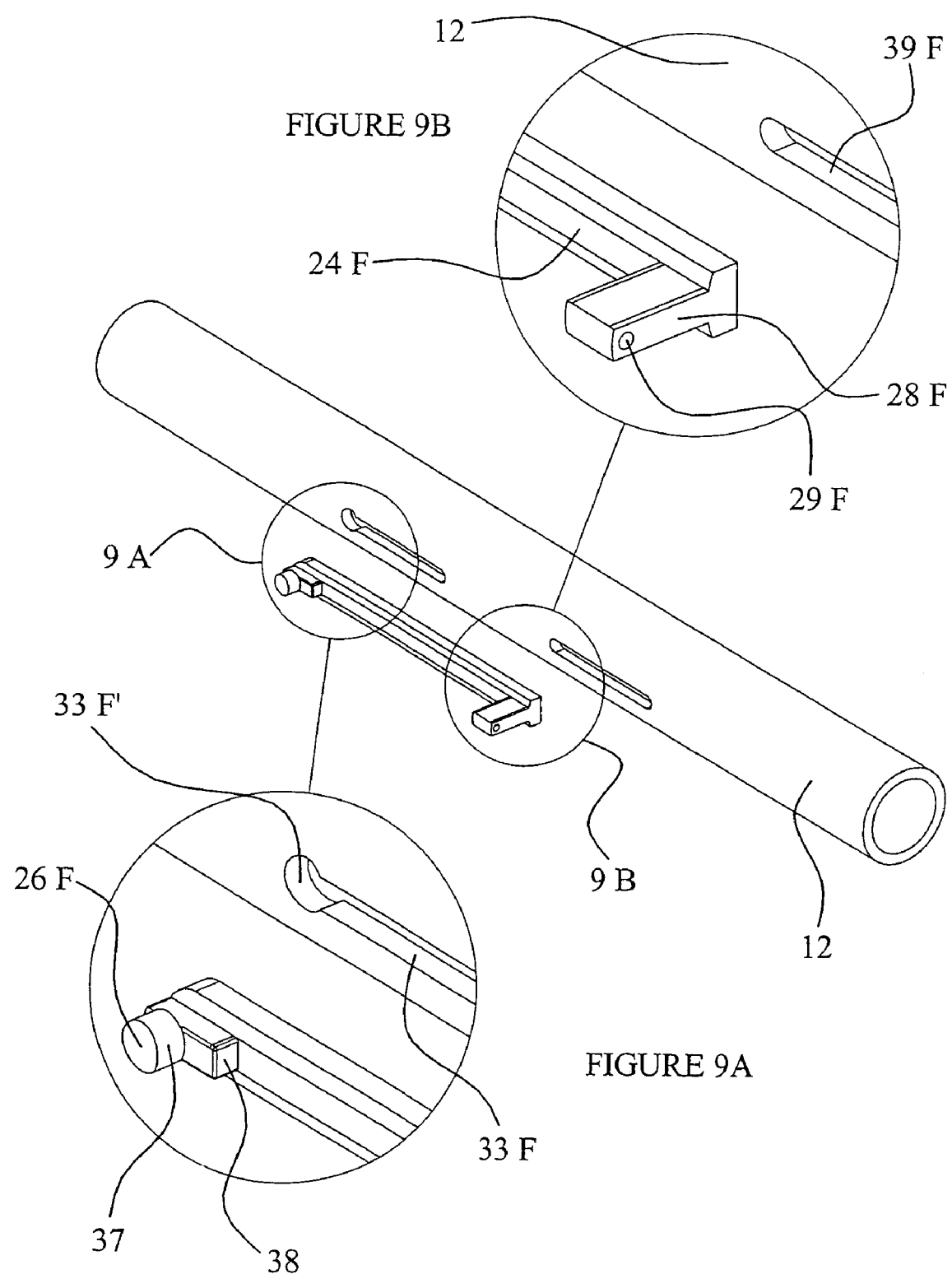
FIG. 9 depicts is an enlarged isometric view of a portion of the handlebar of FIG. 1 with the cam follower removed.

Cables 14 are attached to cable anchors 28 by any suitable means for attaching the cables to the cable anchors. In the embodiment of FIGS. 8 and 9, each cable 14 passes through an aperture 29 in the corresponding cable anchor 28. Cables 14 have enlarged portions 30 (see FIG. 4) that will not fit through apertures 29. Other means could be used for attaching cables 14 to cable anchors 28. For example, a cable 14 having an enlarged end portion could pass through a slot in a cable anchor or a mechanical clamp could be provided on the cable anchor for the purpose of holding the cable.

Each cable 14 runs within a sheath 32. The position of a cable 14 relative to its sheath 32 can be adjusted by way of an adjusting nut 34, which adjustably engages a cable guide 35. Cable guide 35 may be attached, for example by clamping, to handlebar 12. In the illustrated embodiment, cable guide 35 is not affixed to handlebar 12. Cable guide 35 is kept in position by cable 14 which is held in place by cam followers 22. Allowing cable guide 35 to float somewhat permits mechanism 10 to be displaced so that it can absorb some impacts without suffering damage. Tension in cables 14 holds cable guide 35 snugly against brake post 45. A cover 36 (see FIG. 2) may be provided to protect cable anchors 28 and keep dirt and other contaminants out of the mechanism.

Members 24 are configured so that they do not interfere with one another as they move. This may be achieved by spacing members 24 apart in a circumferential direction. Members 24 may be opposed to one another, as illustrated, or may be more closely spaced around the circumference of handlebar 12. For example, members 24 could be circumferentially spaced apart by 90 degrees or some other angle.

As shown in FIG. 8, members 24 are located inside handlebar 12. Followers 26 project outwardly through slots 33 in handlebar 12. As shown in FIGS. 8A and 9A, each follower 26 may comprise a head portion 37, which is wider than the corresponding slot 33, and a neck portion 38, which passes through the corresponding slot 33. Neck portion 38 may be elongated relative to head portion 37 as shown in the illustrated embodiment. Slots 33 may have enlarged portions 33' through which head portion 37 can pass. The illustrated configuration ensures that the followers 26 fully engage guide paths 22. Enlarged portions 33' are preferably located a small distance distal to the normal range of motion provided by guide paths 22 so that head portions 37 of followers 36 do not encounter enlarged portions 33' during normal operation.

Cable anchors 28 also project through slots 39 in handlebar 12. In the illustrated embodiment, a bracket 40 is mounted to each of cable anchors 28. Brackets 40 are configured to receive the enlarged ends 30 of cables 14. Brackets 40 are wider than slots 39 and prevent cable anchors 28 from slipping radially inwardly through slots 39. Brackets 40 hold cable anchors 28 in positions such that cables 14 are supported so that they do not rub excessively on surfaces within the bores of adjusting screws 34 and cable guides 35 as gear shifting mechanism 10 is operated. Since each cable 14 passes through a hole in bracket 40 as well as a hole in cable anchor 28, the cable 14 holds its bracket 40 and cable anchor 28 together when the cable 14 is under tension. Therefore, follower members 24 are constrained to move in the longitudinal direction only. Brackets 40 are not essential to the operation of gear shifting mechanism 10.

Guide paths 22 follow trajectories, which move followers 26, and consequently cables 14, in a longitudinal direction as necessary to control front and rear derailleurs (or other shifting mechanisms), to switch through a sequence of gear ratios as handgrip 16 is turned through its range of motion. The longitudinal travel of a member 24 for a given rotation of handgrip 16 depends upon the helical slope (i.e. longitudinal displacement per unit of rotation) of guide path 22 in the region in question. If a particular angular region of a guide path 22 extends generally circumferentially, then rotation of handgrip 16 while a follower 26 is in that particular angular region causes little or no longitudinal motion of the corresponding member 24. Conversely, if a follower 26 is in an angular region where the guide path 22 has a greater helical slope, rotation of handgrip 16 causes a greater longitudinal movement of the corresponding member 24. Front and rear guide paths 22 are, in general, shaped differently from one another. Consequently, rotation of handgrip 16 through a range of angles can cause member 24F to move through a different distance and/or move in a different direction from member 24R.

In the illustrated embodiments, guide paths 22 are shaped so that, when handgrip 16 is in any one of a plurality of discrete angular positions, cables 14 are positioned to provide a specific gear ratio corresponding to that angular position.

Gear shifting mechanism 10 preferably includes a detent mechanism whereby, when handgrip 16 is in one of these discrete angular positions, there is some resistance to rotating handgrip 16 in either angular direction. In preferred embodiments, at least one of cables 14 is maintained under tension and a corresponding one of guide paths 20 has indentations 41 located along it. Indentations 41 are at places such that, when handgrip 16 is in one of the discrete angular positions, the follower 26 is engaged in one of the indentations. Indentations 41 are shaped so that follower 26 must be moved to pull on the corresponding cable if handgrip 16 is rotated in either angular direction. Cables 14 are maintained under tension by springs or other bias elements (not shown). The bias elements may be parts of the corresponding front and rear derailleurs or other shifting mechanisms operated by cables 14. Currently available front and rear derailleurs typically include springs which serve as bias elements. A separate detent mechanism could be present within the mechanism of gear shifting device 10. A separate detent mechanism is not required in the illustrated embodiment of the invention.

Gear shifting device 10 can be made very compact. As shown in FIG. 2, gear shifting device 10 may be compact enough that it does not interfere with the use of a typical bicycle brake lever 44. A post 45 which supports brake lever 44 may be integrated with gear shifting device 10 as shown in FIG. 3. Post 45 may be part of a standard brake clamp.

A bicycle may have a large number of gear ratios which are available in theory. For example, a bicycle having 3 front sprockets and 8 rear sprockets has, in theory, 3×8=24 distinct gear ratios. With conventional shifters all possible gear ratios are typically available. In practice, not all combinations of a front sprocket and a rear sprocket are desirable for use. Many possible gear combinations provide gear ratios that are redundant and/or result in severe cross chaining conditions. It is desirable to avoid "cross-chaining". Cross-chaining occurs, for example, where the chain is engaged on the largest front sprocket and the largest rear sprocket (or the smallest front sprocket and the smallest rear sprocket). Further, some different combinations of front and rear sprockets typically provide very similar gear ratios. For a given set of front and rear sprockets, there is typically a set of pairs of front and rear sprockets that provide an optimum shift pattern. For example, Table I shows gear ratios for a bicycle having three front sprockets respectively with 28, 38 and 48 teeth and eight rear sprockets, respectively with 11, 13, 15, 17, 20, 23, 26, and 30 teeth.

TABLE I

GEAR RATIOS

| TEETH (FRONT–REAR) | RATIO | INCLUDE | COMMENT |
|---|---|---|---|
| 28–30 | 0.93 | Y | 1 - Lowest gear |
| 28–26 | 1.08 | Y | 2 |
| 28–23 | 1.22 | Y | 3 |
| 38–30 | 1.27 | N | Cross chain |
| 28–20 | 1.4 | Y | 4 |
| 38–26 | 1.46 | N | Cross chain |
| 48–30 | 1.6 | N | Cross chain |
| 38–23 | 1.65 | Y | 5 |
| 28–17 | 1.65 | N | Cross chain |
| 48–26 | 1.85 | N | Cross chain |
| 28–15 | 1.87 | N | Cross chain |
| 38–20 | 1.9 | Y | 6 |
| 48–23 | 2.09 | N | Cross chain |
| 28–13 | 2.15 | N | Cross chain |
| 38–17 | 2.24 | Y | 7 |
| 48–20 | 2.40 | N | Cross chain |
| 38–15 | 2.53 | Y | 8 |
| 28–11 | 2.55 | N | Cross chain |
| 48–17 | 2.82 | Y | 9 |
| 38–13 | 2.92 | N | Cross chain |
| 48–15 | 3.2 | Y | 10 |
| 38–11 | 3.45 | N | Cross chain |
| 48–13 | 3.69 | Y | 11 |
| 48–11 | 4.36 | Y | 12 - Highest gear |

As shown in the "Include" column of Table I, one can achieve a sequence of front-rear sprocket pairs that represents a desirable shift pattern by eliminating front-rear sprocket pairs that have undesirable cross-chaining and front-rear sprocket pairs that provide gear ratios, which are similar to those of other front-rear sprocket pairs. The resulting optimized shift pattern has a reduced number of gear ratios. For example, the shift pattern of Table I includes 12 of the 24 possible front-rear sprocket pairs. Guide paths 22 may be shaped to provide an optimized shift pattern, such as that shown in Table I, in which continued rotation of handgrip 16 in one angular direction progressively operates cables 14 to select, in sequence, the pairs of sprockets included in the optimized shift pattern.

Figure 10:
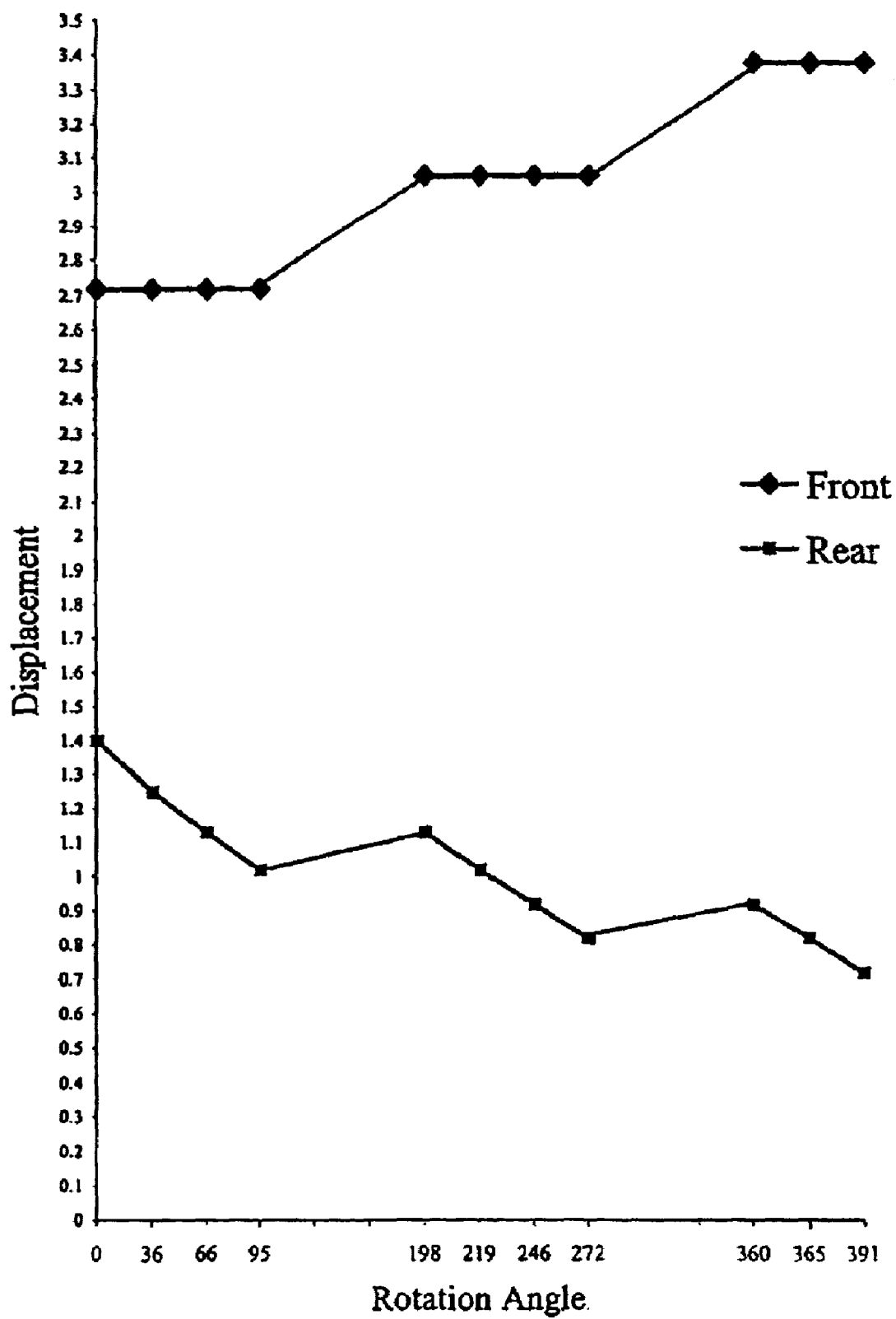
FIG. 10 is a graph of cable extension as a function of handgrip rotation angle for one embodiment of the gear shifting mechanism.

FIG. 10 is a graph depicting the longitudinal displacement (x) of cables 14F and 14R for a given rotational angle (Θ) of handgrip 16. FIG. 10 shows an optimal shift pattern for a 3×7 configuration in which 11 of 21 possible gear combinations are used. It can be seen from FIG. 10, that the discrete angular positions of handgrip 16 do not need to be equally angularly spaced-apart from one another. It can also be seen from FIG. 10 that guide paths 22 may extend around handgrip 16 by more than 360 degrees such that more than one full revolution of handgrip 16 is required to move through the full range provided by guide paths 22.

The torque required to turn handgrip 16 increases with the tension in cables 14 and with the displacement (x) through which cables 14 are pulled for a given angular rotation (Θ) of handgrip 16 (i.e. the helical slope of guide paths 22). Friction between components also affects the required torque. In general, a user must do more work between discrete angular positions for shifts in which both cables 14 are being pulled (e.g. shifts in which both front and rear derailleurs are moving the chain to a larger sprocket—an example of such a shift is the shift between the $8^{th}$ and $9^{th}$ gear ratios of the shift sequence shown in both Table I and FIG. 10, wherein the shift is from the 38-15 sprocket pair to the 48-17 sprocket pair). The torque that a user must apply to make such difficult shifts can be reduced by shaping guide paths 22, so that hand grip 16 rotates through a larger rotation angle (Θ) when such difficult than it does for shifts which require less mechanical work to accomplish. This shape for guide paths 22 is represented in FIG. 10 by a line having a lesser relative slope. Conversely, guide paths 22 can be shaped such that handgrip 16 rotates through a smaller angle when shifts that require less work are made. This variation in the rotational angle between discrete angular positions permits guide paths 22 to have a variety of helical slopes ranging from more gradual to less gradual depending on the amount of work required.

In some embodiments of the invention, guide paths 22 are shaped such that followers 26 move by no more than 0.06 mm in a longitudinal direction per degree of rotation of handgrip 16 as they traverse the portions of guide paths 22 between adjacent discrete angular positions. In some embodiments followers move by not more than 0.03 mm per degree of rotation averaged over a shift.

Figures 11, 11A:
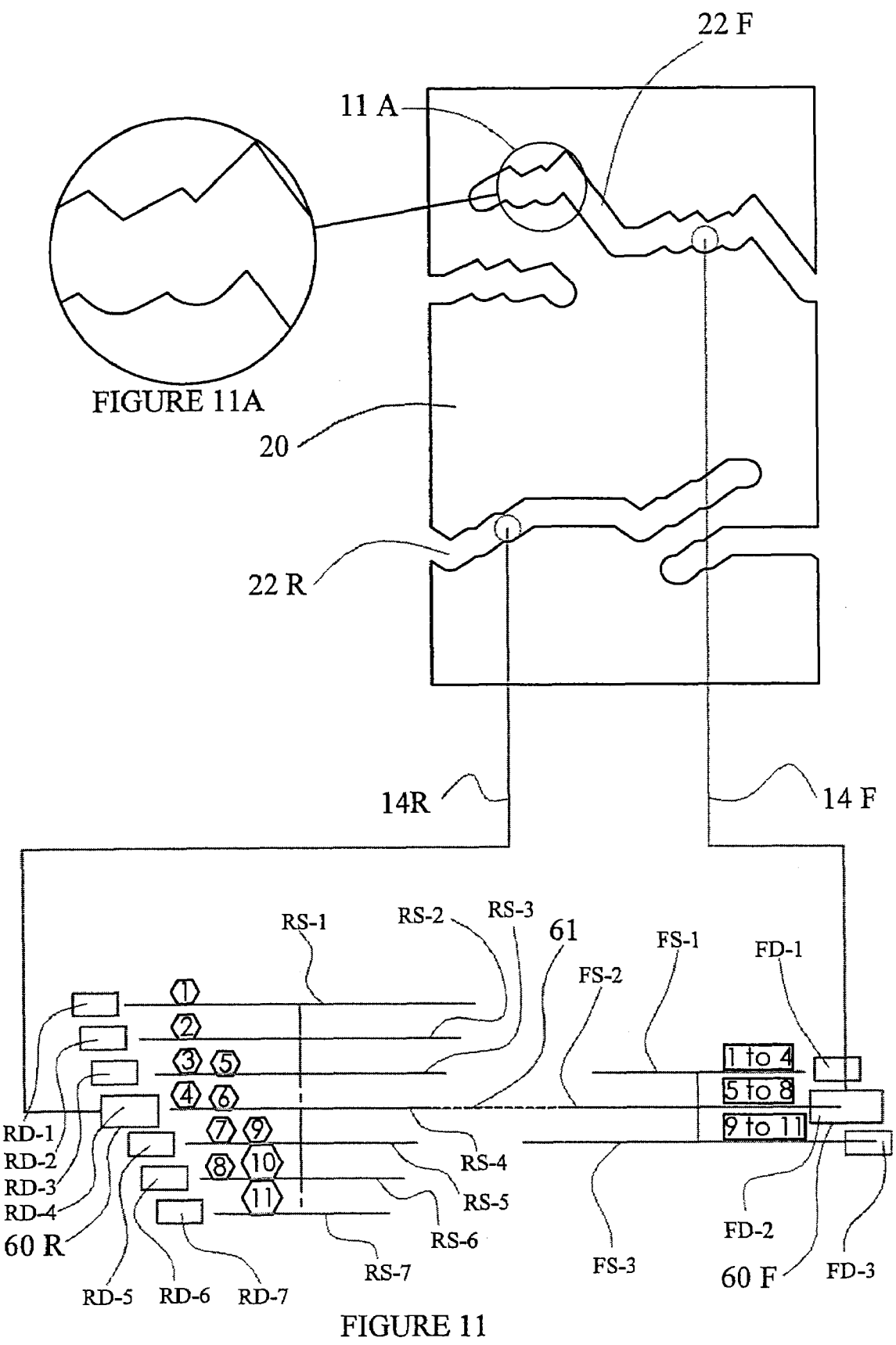
FIG. 11 is a schematic diagram, which illustrates the operation of a gear shifting mechanism according to an embodiment of the invention
FIG. 11A is a magnified view of the area indicated by reference character 11A in FIG. 11.

FIG. 11 illustrates one specific embodiment of the invention in which a front derailleur 60F is controlled by cable 14F and a rear derailleur 60R is controlled by cable 14R. A chain 61 can be engaged with a selected one of front sprockets FS-1, FS-2, and FS-3 by placing front derailleur 60F in a corresponding one of its positions FD-1, FD-2, and FD-3. Similarly, rear derailleur 60R has a number of positions RD-1 to RD-7, which place the chain on a corresponding one of rear sprockets RS-1 to RS-7.

Figure 12A:
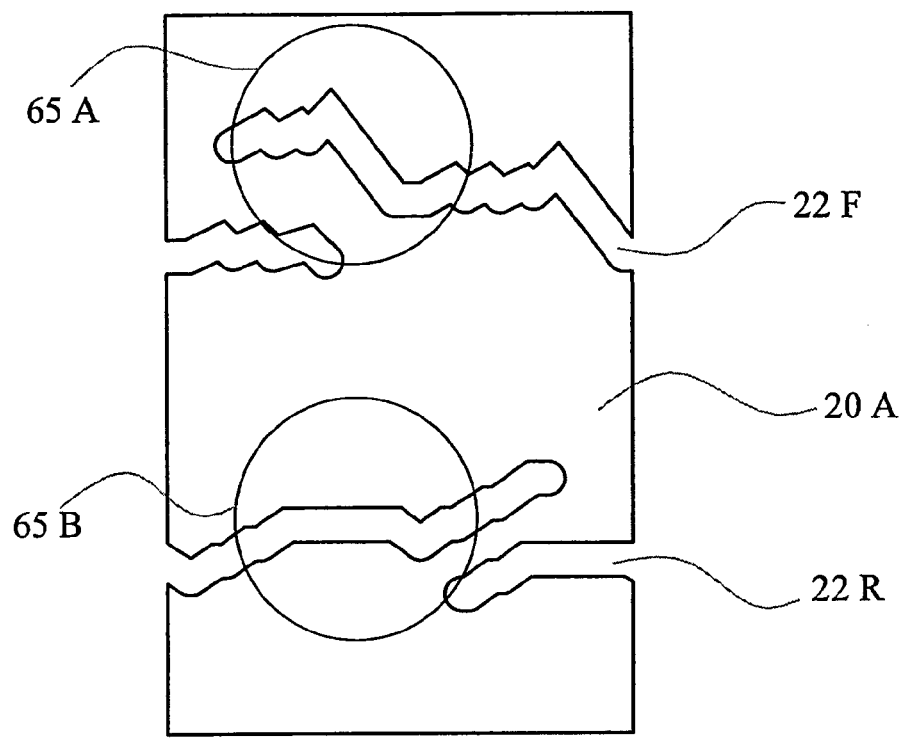
FIG. 12A is a view of guide paths in a shifter according to one embodiment of the invention and FIG. 12B is a magnified view of a portion of the guide paths of FIG. 12A.
Figure 12B:
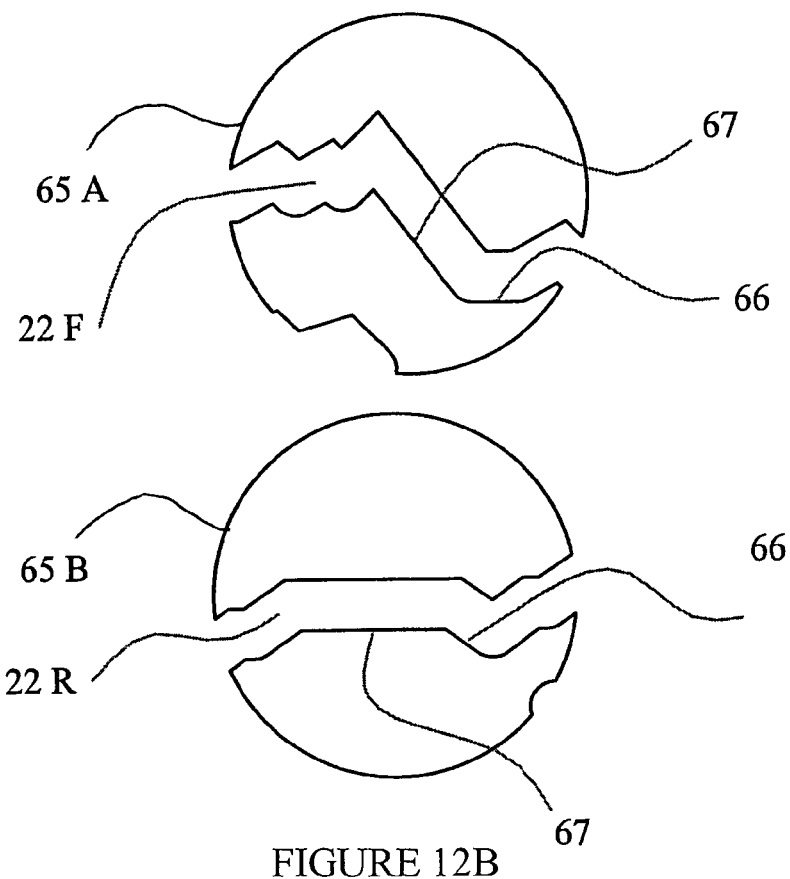

The torque which a user must apply to rotate handgrip 16 can be further controlled by tailoring the shape of guide paths 22 in their portions which control shifts involving changes in the positions of both front and rear derailleurs. As shown in FIGS. 12A and 12B, guide paths 22 may be constructed so that only one derailleur is moved at a time in such shifts. Angular portion 65 corresponds to a shift in which guide path 22F shifts front derailleur 60F (see FIG. 11) and guide path 22R shifts rear derailleur 60R (see FIG. 11). As best seen in FIG. 12B, in a first part 66 of angular portion 65, guide path 22R angles so that rear derailleur 60R is shifted while guide path 22F has no slope so that front derailleur 60F is not shifted. In a second part 67 of angular portion 65, guide path 22F angles so that front derailleur 60F is shifted while guide path 22R has no slope so that rear derailleur 60R is not shifted.

Some particular shifts involve changing the positions of both the front and rear derailleurs. For example, as shown in FIGS. 10 and 11, the shifts between the $4^{th}$ and $5^{th}$ gear ratios and the $8^{th}$ and $9^{th}$ gear ratios involve changing the positions of both front derailleur 60F and rear derailleur 60R. In some embodiments of the invention, such multi-derailleur shifts may involve moving one derailleur and then moving the other derailleur. For example, when switching from the $4^{th}$ to $5^{th}$ gear ratio, the guide paths 22R and 22F may be shaped, such that rear derailleur 60R moves first, so that chain 61 moves from the $4^{th}$ rear sprocket (RS-4) to the larger $3^{rd}$ rear sprocket (RS-3), and thereafter front derailleur 60F moves, so that chain 61 moves from the $1^{st}$ front sprocket (FS-1) to the larger $2^{nd}$ front sprocket (FS-2). The order of movement of front derailleur 60F and rear derailleur 60R will be reversed when shifting down from the $5^{th}$ to the $4^{th}$ gear ratio. Other multi-derailleur shifts may be implemented in a similar manner, such that one derailleur is moved prior to the other.

It can be appreciated that the embodiments described above provide bicycle gear shifters, which may be made in a compact rugged units. One feature that helps to make mechanism 10 compact is that cable anchors 28 are located inboard with respect to brake post 45 while cam cylinder 20 and followers 26 are located out board with respect to brake post 45. Cam follower members 24 move longitudinally within the normal bore of brake post 45.

While this invention has been described with reference to illustrative embodiments, the invention is not limited to the embodiments described herein. It will be apparent to those skilled in the art in the light of the foregoing disclosure that many alterations and modifications are possible in the practice of this invention without departing from the spirit or scope thereof. For example:

A shifting mechanism according to the invention may be adapted to control "push-pull" derailleurs;

The invention may be applied to the selection of ratios in transmissions other than bicycle transmissions. The invention may be applied in pedal-powered vehicles such as pedal-powered tricycles, pedal cars, pedal-powered water craft and the like. The invention may be applied to selecting gear ratios in other apparatus, which include a handgrip and a suitable variable-ratio power transmission;

Shifting mechanisms other than derailleurs may be controlled by the gear shifting mechanism. For example, a gear shifting mechanism according to the invention may be used to select a ratio in a transmission which includes a front or rear derailleur and a variable-ratio gear train internal to a hub of the driven wheel;

With an additional guide path 22 and associated coupling to a third cable, a gear shifting mechanism according to the invention may be used to select a ratio in a transmission having three shifting mechanisms. For example, a transmission having front and rear derailleurs and an additional variable gear train internal to a hub of the driven wheel;

While the gear shifting mechanism 10 is shown in the Figures as being associated with a right handgrip, a gear shifting mechanism according to the invention could be associated with a left handgrip or with a handgrip not mounted on a handlebar;

The number of discrete angular positions for each of the gear selecting mechanisms may be varied (i.e. in the illustrated embodiments, the numbers of front and rear sprockets can be varied); and, The particular selection of gear ratios is not critical to the invention. The gear ratios used preferably provide an optimal shift pattern. Determining an optimal shift pattern for any derailleur system is a matter of simply arranging gear ratios in ascending order and selecting a sequence that minimizes cross chaining. This is not difficult for anyone skilled in the art and is an obvious starting point for any integrated shifter design.

Figure 13:
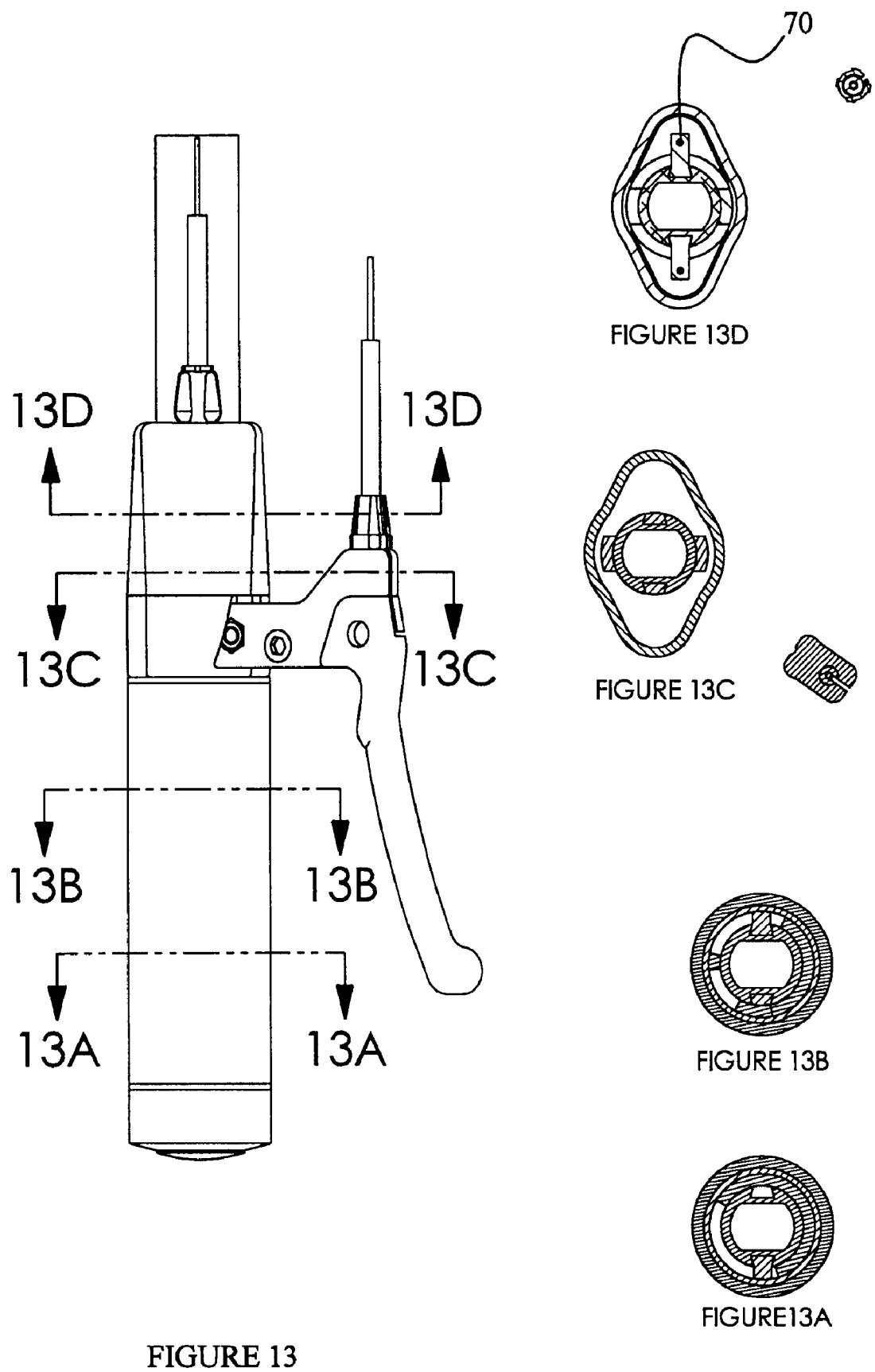
Figure 14:
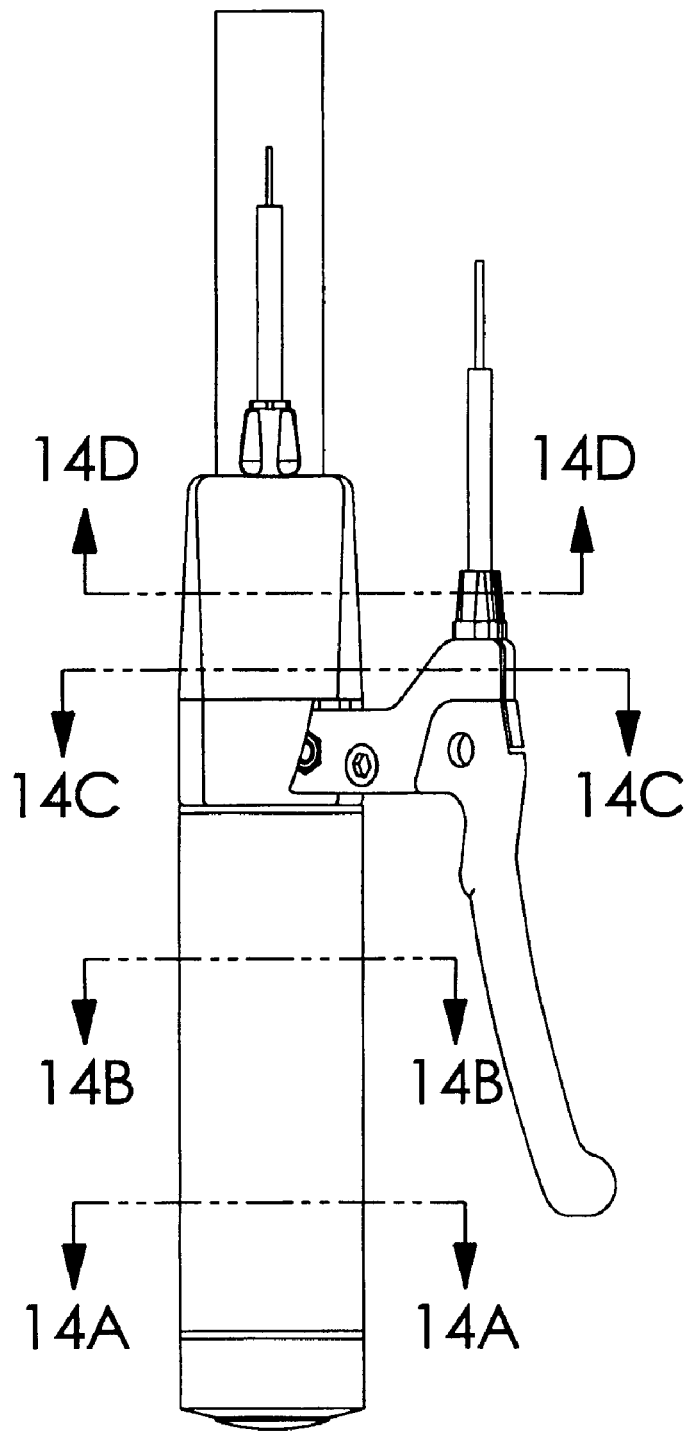
FIGS. 14A–14D are cross sections through the gear shifting mechanism of FIG. 14.
Figure 14D:
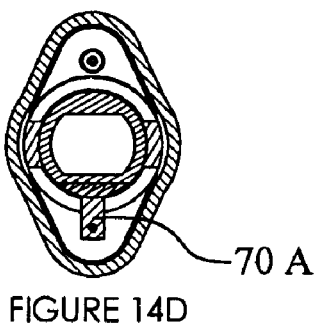
Figure 14C:
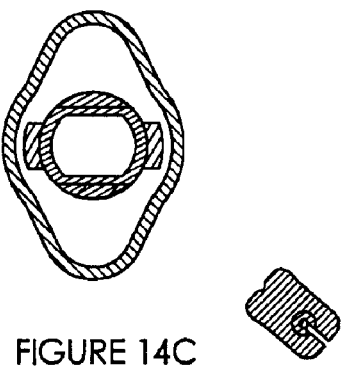
Figure 14B:
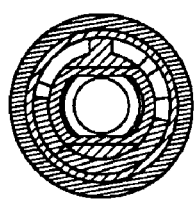
Figure 14A:
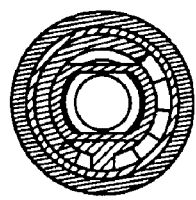

Instead of being located inside the bore of a handlebar, members 24 may slide in longitudinal grooves 70 on an exterior surface of a handlebar as shown, for example, in FIG. 13. As a further alternative, handlebar 12 may comprise flattened faces 70A and members 24 may slide on the flattened faces as shown in FIG. 14.

Instead of using cables 14 to control the operation of derailleurs, a gear shifter according to the invention may comprise hydraulic or pneumatic mechanisms which control the operation of gear shifting devices such as derailleurs in response to movements of followers 26.

Accordingly, the scope of the invention is to be construed in accordance with the substance defined by the following claims.

What is claimed is:

1. A gearshift mechanism comprising:
a handgrip member disposed on a handlebar having an outer surface, the handgrip member rotatable about an axis relative to first and second followers and having a bore and first and second guide paths on a substantially cylindrical inner surface portion within the bore wherein the first and second guide paths comprise grooves on the inner surface of the handgrip member;
the first and second followers respectively engaging the first and second guide paths; and,
first and second anchors coupled respectively to the first and second followers;
wherein the substantially cylindrical inner surface portion of the handgrip member fits around the outer surface of the handlebar and, rotation of the handgrip member about the axis simultaneously adjusts positions of the first and second anchors;
wherein the handlebar is hollow and the first and second followers are coupled respectively to the first and second anchors by members which extend through a bore of the handlebar.

2. The gearshift mechanism of claim 1, wherein the first and second followers extend through longitudinally disposed slots in the handlebar.

3. The gearshift mechanism of claim 2, wherein each follower comprises a head portion, which is wider than a corresponding one of the slots and a neck portion, which passes through the corresponding slot.

4. The gearshift mechanism of claim 3, wherein the neck portions of the followers are elongated along the slots relative to the head portions of the followers.

5. The gearshift mechanism of claim 3, wherein each of the slots has an enlarged portion through which the head portion of the corresponding follower can pass.

6. The gearshift mechanism of claim 2, wherein the anchors project from the members through additional longitudinally disposed slots in the handlebar.

7. The gearshift mechanism of claim 6, comprising a bracket on each of the anchors, the bracket having a width greater than a width of the corresponding additional slot.

8. The gearshift mechanism of claim 6 comprising a brakepost mounted to the handlebar in a location between the slots through which the followers extend and the slots through which the anchor members extend.

9. The gearshift mechanism of claim 1 wherein the first and second followers are on opposing sides of the bore.

10. The gearshift mechanism of claim 1 wherein the first and second followers are spaced circumferentially apart around the bore by less than 180 degrees.

11. A gearshift mechanism comprising:
a handgrip member disposed on a handlebar having an outer surface, the handgrip member rotatable about an axis relative to first and second followers and having a bore and first and second guide paths on a substantially cylindrical inner surface portion within the bore;
the first and second followers respectively engaging the first and second guide paths; and,
first and second anchors coupled respectively to the first and second followers;
wherein the substantially cylindrical inner surface portion of the handgrip member fits around the outer surface of the handlebar and, rotation of the handgrip member about the axis simultaneously adjusts positions of the first and second anchors and the first and second followers extend through longitudinally disposed slots in a wall of the handlebar.

12. The gearshift mechanism of claim 11, wherein the handlebar is hollow and the first and second followers are coupled respectively to the first and second anchors by members, which extend through a bore of the handlebar.

13. The gearshift mechanism of claim 12 wherein the first and second followers are on an outboard side of a brake post mounted on the handlebar and the first and second anchors are on an inboard side of the brake post.

14. The gearshift mechanism of claim 12, wherein each follower comprises a head portion, which is wider than a corresponding one of the slots and a neck portion, which passes through the corresponding slot.

15. The gearshift mechanism of claim 14, wherein the neck portions of the followers are elongated along the slots relative to the head portions of the followers.

16. The gearshift mechanism of claim 14, wherein each of the slots has an enlarged portion through which the head portion of the corresponding follower can pass.

17. The gearshift mechanism of claim 11 wherein the first and second guide paths comprise grooves on the inner surface of the handgrip member.

18. The gearshift mechanism of claim 17 wherein the first and second guide paths each have an angular extent exceeding 360 degrees.

19. The gearshift mechanism of claim 17 wherein the first and second followers are on an outboard side of a brake post mounted on the handlebar and the first and second anchors are on an inboard side of the brake post.

20. The gearshift mechanism of claim 11 in combination with a transmission comprising:
a plurality of front sprockets;
a chain;
a plurality of rear sprockets;
a front derailleur capable of engaging the chain with a selected one of the front sprockets;
a rear derailleur capable of engaging the chain with one of the plurality of rear sprockets;
a first linking mechanism coupling the first anchor to the front derailleur; and,
a second linking mechanism connecting the second anchor to the rear derailleur.

21. The gearshift mechanism and transmission combination of claim 20 wherein the anchors comprise cable anchors and the first and second linking mechanisms respectively comprise:
a first cable connecting the first cable anchor to the front derailleur; and,
a second cable connecting the second cable anchor to the rear derailleur.

22. The gear shifter mechanism of claim 17, wherein at least one of the grooves comprises a plurality of indentations on one side thereof, the indentations located at detent positions.

23. A gearshift mechanism comprising:
a handgrip member disposed on a handlebar having an outer surface, the handgrip member rotatable about an axis relative to first and second followers and having a bore and first and second guide paths on a substantially cylindrical inner surface portion within the bore;
the first and second followers respectively engaging the first and second guide paths; and,
first and second anchors coupled respectively to the first and second followers;
wherein the substantially cylindrical inner surface portion of the handgrip member fits around the outer surface of the handlebar and, rotation of the handgrip member about the axis simultaneously adjusts positions of the first and second anchors
wherein the first and second followers are coupled respectively to the first and second anchors by members which slide in longitudinally-extending recesses in the handlebar.

24. A gearshift mechanism comprising:
a handgrip member disposed on a handlebar having an outer surface, the handgrip member rotatable about an axis relative to first and second followers and having a bore and first and second guide paths on a substantially cylindrical inner surface portion within the bore;
the first and second followers respectively engaging the first and second guide paths; and,
first and second anchors coupled respectively to the first and second followers;
wherein the substantially cylindrical inner surface portion of the handgrip member fits around the outer surface of the handlebar and, rotation of the handgrip member about the axis simultaneously adjusts positions of the first and second anchors;
wherein the first and second followers are on an outboard side of a brake post mounted on the handlebar and the first and second anchors are on an inboard side of the brake post.

25. The gearshift mechanism of claim 24 wherein the brake post is mounted to the handlebar by a clamp, a first member connects the first follower and the first anchor, a second member connects the second follower and the second anchor and the first and second members pass through an aperture of the clamp.

26. The gearshift mechanism of claim 24 wherein the brake post supports the rotatable handgrip from sliding inwardly along the handlebar.

27. The gear shifter mechanism of claim 26, wherein the handgrip member is rotatably mounted on the handlebar and the first and second followers are coupled respectively to the first and second anchors by members which slide in longitudinally-extending recesses in the outer surface of the handlebar.

* * * * *

UNITED STATES PATENT AND TRADEMARK OFFICE
CERTIFICATE OF CORRECTION

| | | |
|---|---|---|
| PATENT NO. | : 7,204,169 B2 | Page 1 of 1 |
| APPLICATION NO. | : 10/410291 | |
| DATED | : April 17, 2007 | |
| INVENTOR(S) | : Ross Mitchell | |

It is certified that error appears in the above-identified patent and that said Letters Patent is hereby corrected as shown below:

Column 10, line 30; "such difficult than" is replaced by -- such difficult shifts are made than --.

Signed and Sealed this

Twenty-first Day of August, 2007

JON W. DUDAS
*Director of the United States Patent and Trademark Office*